United States Patent
Oguma (10) Patent No.: US 10,462,310 B2
(45) Date of Patent: Oct. 29, 2019

(54) PULL-PRINT COMPATIBLE IMAGE FORMING SYSTEM, SERVER AND IMAGE FORMING METHOD

(71) Applicant: KYOCERA Document Solutions Inc., Osaka (JP)

(72) Inventor: Takashi Oguma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/942,354

(22) Filed: Mar. 30, 2018

(65) Prior Publication Data

US 2018/0288245 A1 Oct. 4, 2018

(30) Foreign Application Priority Data

Mar. 31, 2017 (JP) .................. 2017-069689

(51) Int. Cl.
| | | |
|---|---|---|
| *G06F 3/12* | (2006.01) | |
| *H04N 1/00* | (2006.01) | |
| *H04N 1/32* | (2006.01) | |

(52) U.S. Cl.
CPC ....... *H04N 1/00209* (2013.01); *G06F 3/1206* (2013.01); *G06F 3/1247* (2013.01); *G06F 3/1254* (2013.01); *G06F 3/1256* (2013.01); *G06F 3/1267* (2013.01); *G06F 3/1288* (2013.01); *H04N 1/0023* (2013.01);
(Continued)

(58) Field of Classification Search
CPC .................................................. G06F 3/1288
See application file for complete search history.

(56) References Cited

U.S. PATENT DOCUMENTS

2004/0080767 A1* 4/2004 Meilstrup ............. G06F 3/1205
358/1.13
2008/0086542 A1* 4/2008 Mukherjee .......... G06F 21/6236
709/219
(Continued)

FOREIGN PATENT DOCUMENTS

CN 102446076 A 5/2012
JP 2001-282470 A 10/2001

OTHER PUBLICATIONS

China National Intellectual Property Administration. Office Action of foreign counterpart, dated May 28, 2019.

*Primary Examiner* — Benjamin O Dulaney
(74) *Attorney, Agent, or Firm* — Hawaii Patent Services; Nathaniel K. Fedde; Kenton N. Fedde (57) ABSTRACT

Provided is an image forming system that is capable of displaying an accurate preview image in pull output. A document-data-receiving unit of a server receives document data from a terminal. A data-type-determining unit determines whether received document data is direct-output data or pull-output data. A document-data-retransmitting unit, when document data is determined to be direct-output data, transmits the document data as is to an image forming apparatus. A model-information-acquiring unit, when document data is determined to be pull-output data, acquires model information from the image forming apparatus. A preview-creating unit performs rasterization of the document data according to the model information, and creates preview data. A preview-transmitting unit transmits preview data that is created by the preview-creating unit to the image forming apparatus.

4 Claims, 7 Drawing Sheets

(52) U.S. Cl.
CPC ..... *H04N 1/00095* (2013.01); *H04N 1/00233* (2013.01); *H04N 1/00244* (2013.01); *H04N 1/32128* (2013.01); *G06F 3/1232* (2013.01)

(56) References Cited

U.S. PATENT DOCUMENTS

| | | | |
|---|---|---|---|
| 2010/0309515 A1* | 12/2010 | Odagawa | G06F 3/1208 358/1.15 |
| 2011/0038002 A1* | 2/2011 | Nakamura | G06F 3/121 358/1.15 |
| 2012/0081741 A1* | 4/2012 | Iida | G06K 15/005 358/1.15 |
| 2017/0013139 A1* | 1/2017 | Suzuki | H04N 1/0023 |

\* cited by examiner

PULL-PRINT COMPATIBLE IMAGE FORMING SYSTEM, SERVER AND IMAGE FORMING METHOD

INCORPORATION BY REFERENCE

This application is based on and claims the benefit of priority from Japanese Patent Application No. 2017-069689 filed on Mar. 31, 2017, the contents of which are hereby incorporated by reference.

BACKGROUND

The present disclosure relates to an image forming system, a server and an image forming method, and particularly relates to a pull-print compatible image forming system, server and image forming method.

Conventionally, there are image forming apparatuses such as an MFP (Multifunctional Peripheral) and the like that are capable of printing documents and images.

Of typical image forming apparatuses, there are image forming apparatuses that, after determining whether or not a data file can be processed by the apparatus itself, when the data file is a data file that can be processed by the apparatus itself, performs RIP processing (Raster Image Processing, Rasterize, hereafter, simply referred to as "rasterization") by the apparatus itself. In this typical image forming apparatus, when the data file is a data file that cannot be processed by the apparatus itself, the server is made to generate image data for executing printing based on the data file.

SUMMARY

The image forming system according to the present disclosure is an image forming system that includes a terminal, a server and an image forming apparatus. The terminal includes a document-data transmitting unit. The document-data-transmitting unit transmits document data to the server as direct-output data that is directly outputted by the image forming apparatus, or as pull-output data that is stored in the server and outputted according to an instruction from the image forming apparatus. The server includes a document-data-receiving unit, a data-type-determining unit, a document-data-retransmitting unit, a model-information-acquiring unit, a preview-creating unit, and a preview-transmitting unit. The document-data-receiving unit receives the document data from the terminal. The data-type-determining unit determines whether document data that is received by the document-data-receiving unit is direct-output data or pull-output data. The document-data-retransmitting unit, when the document data is determined to be direct-output data by the data-type-determining unit, transmits the document data as is to the image forming apparatus. The model-information-acquiring unit, when the document data is determined to be pull-output data by the data-type-determining unit, acquires model information from the image forming apparatus. The preview-creating unit performs rasterization of the document data according to the model information acquired by the model-information-acquiring unit, and creates preview data. The preview-transmitting unit transmits the preview data created by the preview-data-creating unit to the image forming apparatus. The image forming apparatus includes an input unit, a preview-data-acquiring unit, a display unit, a document-data-acquiring unit, and a rasterizing unit. The input unit acquires an instruction for selecting and outputting the document data that is pull-output data stored in the server. The preview-data-acquiring unit acquires the preview data of the document data that is selected by the input unit from the server. The display unit displays the preview data that is acquired by the preview-data-acquiring unit. The document-data-acquiring unit acquires the document data for which there is an output instruction by the input unit from the server, and also acquires the document data that is direct-output data from the server. The rasterizing unit performs rasterization of the document data that is acquired by the document-data-acquiring unit, and creates output data.

The server according to the present disclosure includes a document-data-receiving unit, a data-type-determining unit, a document-data-retransmitting unit, a model-information-acquiring unit, a preview-creating unit, and a preview-transmitting unit. The document-data-receiving unit receives document data from a terminal. The data-type-determining unit determines whether the document data that is received by the document-data-receiving unit is direct-output data from the terminal that is directly outputted by the image forming apparatus, or pull-output data that is stored in the server and then outputted according to an instruction from the image forming apparatus. The document-data-retransmitting unit, when the document data is determined to be direct-output data by the data-type-determining unit, transmits the document data as is to the image forming apparatus. The model-information-acquiring unit, when the document data is determined to be pull-output data by the data-type-determining unit, acquires model information from the image forming apparatus. The preview-creating unit performs rasterization according to the model information that is acquired by the model-information-acquiring unit, and creates preview data from the document data. The preview-transmitting unit transmits the preview data that is created by the preview-creating unit to the image forming apparatus.

The image forming method according to the present disclosure is an image forming method that is executed by an image forming system that includes a terminal, a server and an image forming apparatus. The terminal transmits document data to the server as direct-output data that is directly outputted by the image forming apparatus, or as pull-output data that is stored in the server and then outputted according to an instruction from the image forming apparatus. The server receives the document data from the terminal. The server determines whether the received document data is direct-output data or pull-output data. The server, when the document data is determined to be direct-output data, transmits the document data as is to the image forming apparatus. The server, when the document data is determined to be pull-output data, acquires model information from the image forming apparatus, performs rasterization of the document data according to the acquired model information, and creates preview data. Then, the server transmits the created preview data to the image forming apparatus. The image forming apparatus acquires an instruction for selecting and outputting the document data that is pull-output data stored in the server. The image forming apparatus acquires the preview data of the selected document data from the server. Then, the image forming apparatus displays the acquired preview data. The image forming apparatus acquires the document data for which there is an output instruction from the server, and also acquires the document data that is direct-output data from the server. Then the image forming apparatus performs rasterization of the acquired document data, and creates output data.

DETAILED DESCRIPTION

Embodiment

System Configuration of Image Forming System X

Figure 1:
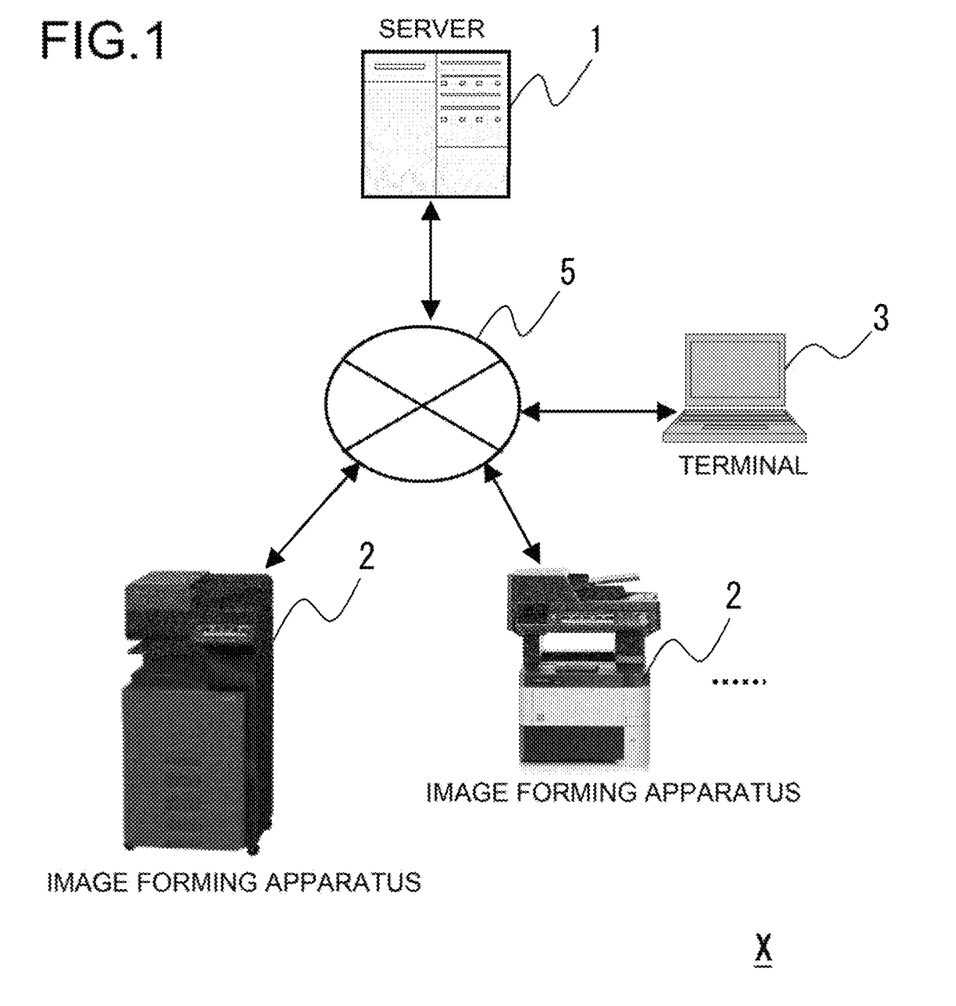
FIG. 1 is a system configuration diagram of an embodiment of an image forming system according to the present disclosure.

First, the system configuration of the image forming system X of an embodiment according to the present disclosure will be explained with reference to FIG. 1 to FIG. 3.

The image forming system X of this embodiment includes a server 1, image forming apparatuses 2 and a terminal 3. Each apparatus is connected by a network 5.

Figure 4:
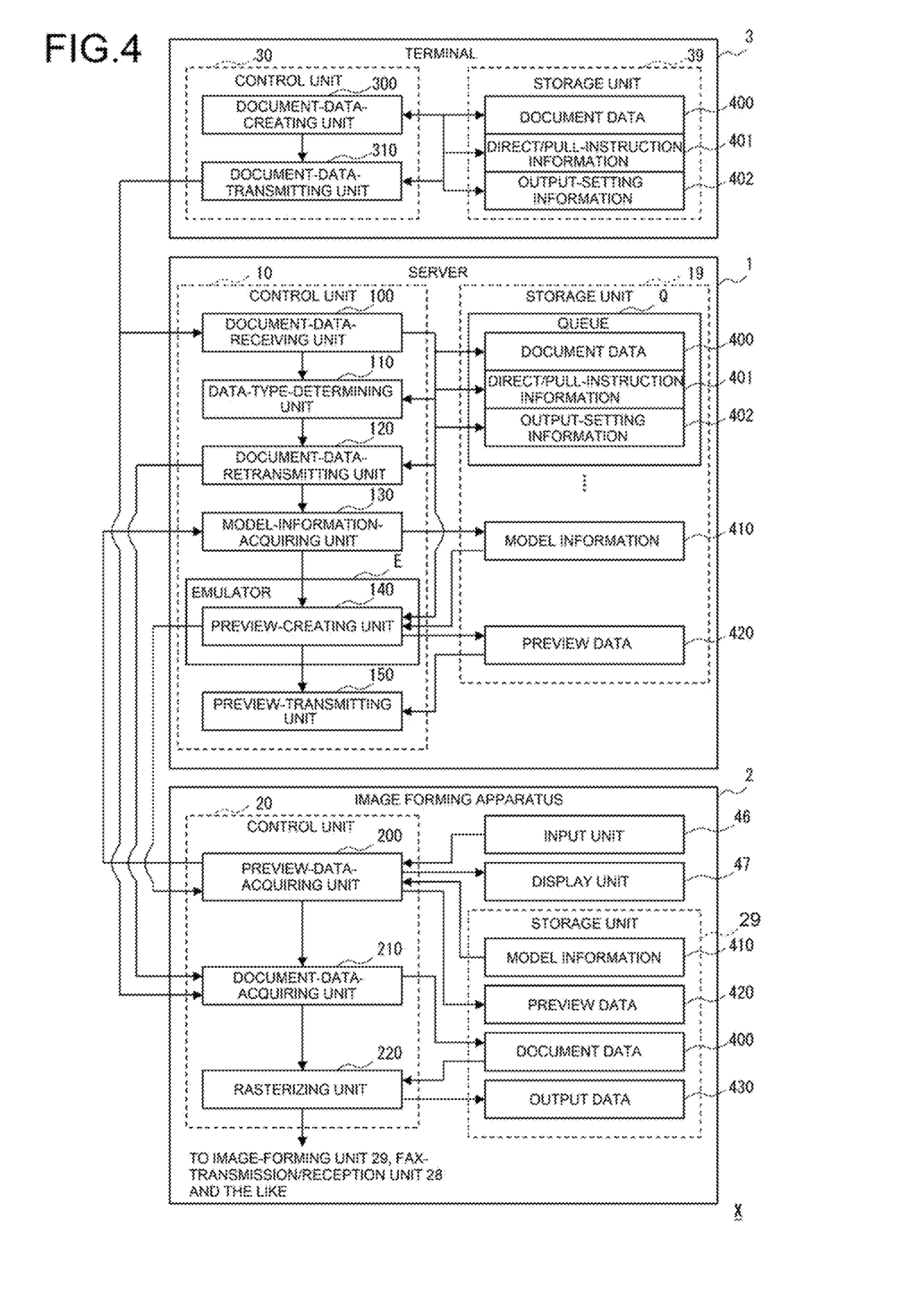
FIG. 4 is a block diagram illustrating the functional configuration of an embodiment of an image forming system according to the present disclosure.

The server 1 is an information processing apparatus that is capable of transmitting and receiving various kinds of data to and from the image forming apparatuses 2, and manages document data 400 (refer to FIG. 4). In this embodiment, the server 1 may be a general-purpose device, a PC (Personal Computer) server, NAS (Network Attached Storage) or the like.

Moreover, the server 1 executes a general-purpose OS (Operating System) such as Linux (registered trademark), Windows (registered trademark) and the like, and provides various services (daemons) on the OS.

Furthermore, the server 1 can perform storage, management, billing, authorization and the like of document data 400 (refer to FIG. 4). The server 1, for example, acquires document data 400 from the terminal 3, temporarily spools the document data 400 as a queue Q, and causes the document data 400 to be outputted by an appropriate image forming apparatus 2. When doing this, the server 1 can cause the document data 400 to be outputted directly by an image forming apparatus 2 as direct output. In addition, the server 1 can cause document data 400 that is stored in a storage unit 19 of the server 1 to be outputted as pull output according to an instruction from an image forming apparatus 2. Details of this pull output will be described later.

Moreover, the server 1 may store document data 400 in a document box (shared folder, storage folder) that is associated with a user.

Incidentally, the server 1 may also be able to perform a transmission process for transmitting document data 400 to a business or office work DMS (Document Management System) or the like.

The image forming apparatus 2 is a document reading apparatus such as an MFP, a network scanner, a document scanner, a network FAX, a printer with a scanner function, and the like. The image forming apparatus 2 may execute application software (hereafter, simply referred to as an "application") for connecting to the server 1.

In the image forming apparatus 2, a general-purpose OS (Operating System) such as Linux (registered trademark), Windows (registered trademark) or the like, an embedded OS, a real time OS or the like operates, and the image forming apparatus executes control of each unit by the control program on the OS.

The terminal 3 is an information processing apparatus such as a PC, portable telephone, smartphone, PDA (Personal Data Assistant), business terminal, special-purpose terminal for an image forming apparatus 2, and the like.

In the terminal 3, various general-purpose OS and the like operate. Moreover, a control program such as a device driver and the like for an image forming apparatus 2 can be installed in the terminal 3. As a result, it is possible to use functions such as printing, scanning, FAX transmission/reception, network FAX and the like of the image forming apparatus 2 from the OS and various applications.

Furthermore, the terminal 3 is able to create and update document data 400 (refer to FIG. 4) that is managed by the server 1.

In this embodiment, the network 5 is a LAN (Local Area Network) such as an Intranet or the like, a WAN (Wide Area Network) such as the Internet (registered trademark), a cellular telephone network or the like, and the like. When the network 5 is a WAN, the network 5 can be connected to another server via a router, gateway or the like. Moreover, the network 5 may be configured as a VPN (Virtual Private Network).

In addition, the image forming system X may also include a plurality of servers 1, image forming apparatuses 2 and terminals 3, respectively.

Figure 2:
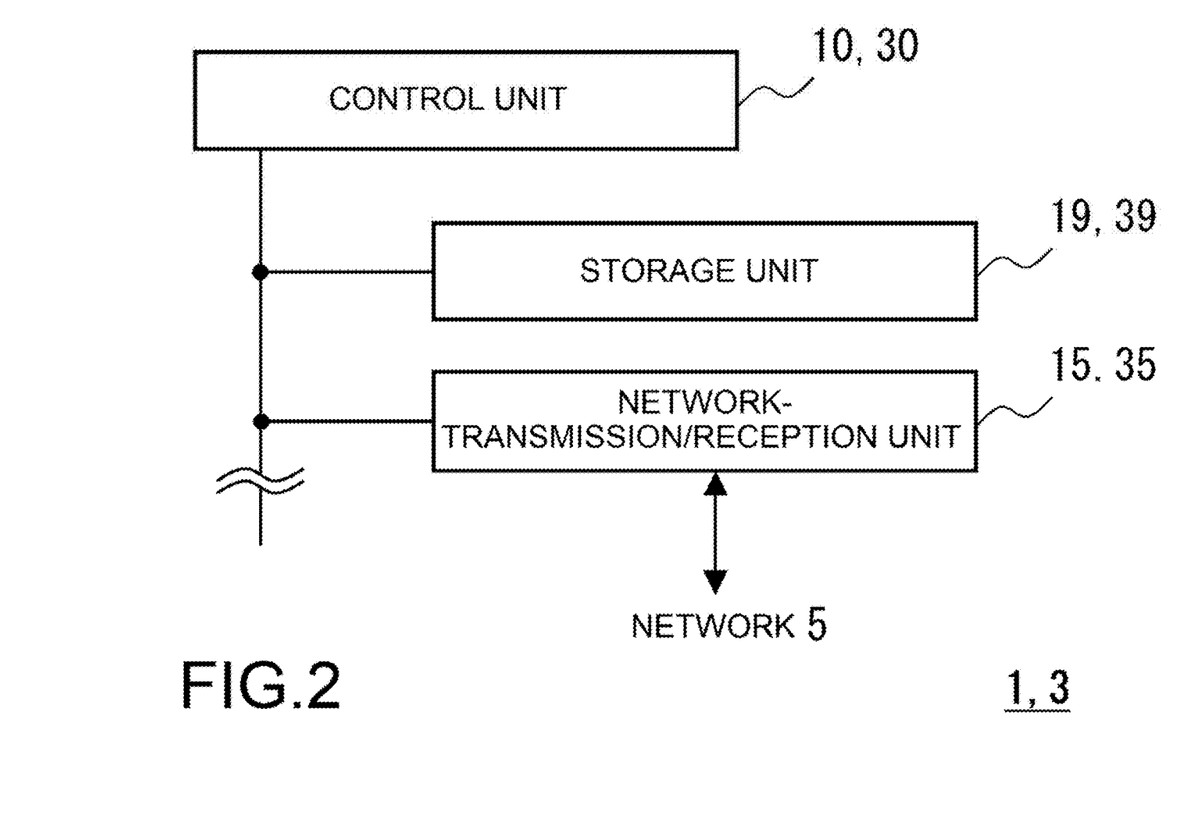
FIG. 2 is a block diagram illustrating the control configuration of the server and terminal illustrated in FIG. 1.

Next, as illustrated in FIG. 2, the server 1 includes a control unit 10, network transmission/reception unit 15 and a storage unit 19. Moreover, the terminal 3 includes a control unit 30, a network transmission/reception unit 35 and storage unit 39.

The control units 10, 30 are information-processing units such as a GPP (General Purpose Processor), CPU (Central Processing Unit), MPU (Micro Processing Unit), DSP (Digital Signal Processor), GPU (Graphics Processing Unit), ASIC (Application Specific Integrated Circuit), or the like.

The control units 10, 30 operate as each of the units of the functional blocks described later by reading control programs that are stored in the ROM, SSD, HDD of the storage units 19, 39, expanding the control programs in RAM and executing the control programs.

Incidentally, the control units 10, 30 may be provided with a built-in RAM, ROM, flash memory or the like.

The network transmission/reception units 15, 35 are network-connecting units that include an LAN board, wireless transceiver, and the like for connecting to the network 5.

The storage units 19, 39 are storage units that use non-transitory recording media. The storage units 19, 39 may also include RAM (Random Access Memory) and the like as a main storage unit. Moreover, storage units 19, 39 may also include a semiconductor memory such as ROM (Read Only Memory), eMMC (embedded Multi Media Card), SSD (Solid State Drive) and the like, and a HDD (Hard Disk Drive) and the like as an auxiliary storage unit. In this case, the control programs for performing operation control of the image forming apparatuses 2 are stored in the auxiliary storage units of the storage units 19, 39.

Furthermore, an area for document boxes (storage folder, shared folder) for each user may be included in the storage units 19, 39.

Incidentally, the storage units 19, 39 may also include external storage media such as various flash memory, optical recording media and the like.

In addition, the terminal 3 may include an input unit and a display unit.

In this case, the input unit is a keyboard, various sensors, a pointing device and the like for acquiring various instructions by a user. The pointing device includes a touch panel, a digitizer, a touch pad, and the like. The input unit allows a user to input various instructions by the GUI (Graphical User Interface) on the OS, and to acquire the instructions. Moreover, it is possible to perform processing such as creating and transmitting document data 400 (refer to FIG. 4), inputting and changing information about each user, and the like according to an instruction that is inputted by a user using the input unit.

The display unit is a flat display panel such as an LCD (Liquid Crystal Display), an organic EL display, a FED (Field Emission Display), a fluorescent display tube and the like, a projector, a status display LED, and the like. The display unit is able to display various operation screens related to the GUI.

Incidentally, the input unit and the display unit may be integrally formed such as in a display with a touch panel, a digitizer, and the like.

Figure 3:
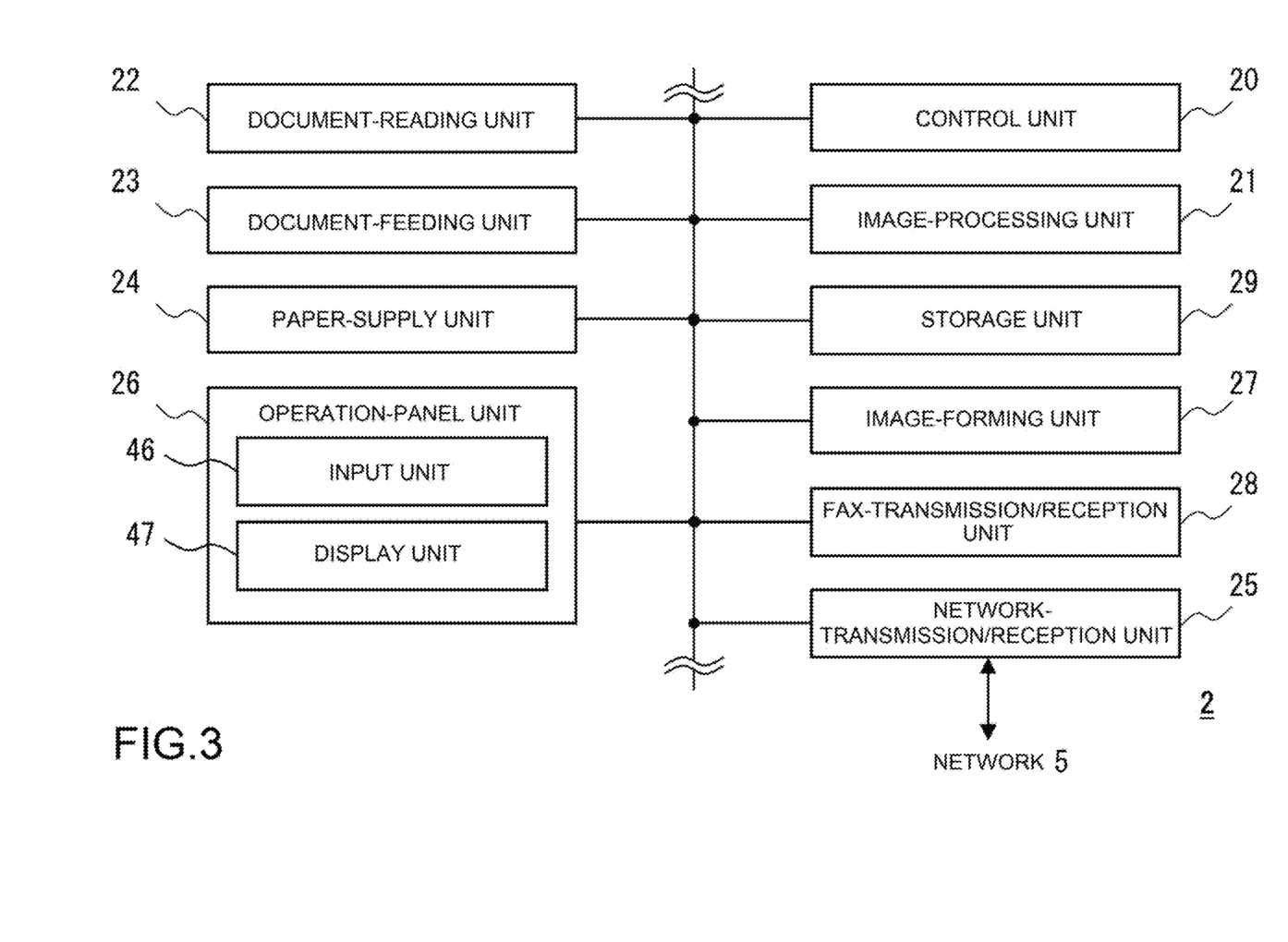
FIG. 3 is a block diagram illustrating the control configuration of the image forming apparatuses illustrated in FIG. 1.

Next, as illustrated in FIG. 3, an image forming apparatus 2 includes an image-processing unit 21, a document-reading unit 22, a document-feeding unit 23, a paper-supply unit 24, a network transmission/reception unit 25, an operation-panel unit 26, an image-forming unit 27, a FAX transmission/reception unit 28, a storage unit 29, and the like. Each unit is connected to a control unit 20, and operation is controlled by the control unit 20.

The control unit 20 is an information-processing unit such as a GPP, CPU, MPU, DSP, GPU, ASIC or the like.

The control unit 20 is operated as each unit of functional blocks that will be described later by reading a control program that is stored in the ROM or HDD of the storage unit 29, expanding the control program in RAM, and executing the control program. Moreover, the control unit 20 performs overall control of the apparatus according to specified instructions that are inputted from the terminal 3 or operation-panel unit 26.

The image-processing unit 21 is an information-processing unit such as a DSP, GPU, and the like. The image-processing unit 21 is a processing unit for performing specified image processing on image data, and, for example, performs various image processing such as enlargement or reduction, density adjustment, gradation adjustment, image enhancement, and the like.

The image-processing unit 21 stores images that are read by the document-reading unit 22 in the storage unit 29 as printing data. When doing this, the image-processing unit 21 is able to convert the printing data in file units having a format such as PDF, TIFF, and the like.

The document-reading unit 22 reads (scans) a document that is set. Moreover, the document-reading unit 22 is arranged on the upper portion of the main body of the image forming apparatus 2.

The document-reading unit 22 includes a scanner, a platen glass, and a document-reading slit. The document-reading unit 22, when reading a document that is set on the platen glass, moves the scanner to a position that faces the platen glass, acquires image data by reading while scanning a document that is placed on the platen glass, and stores the acquired image data in the storage unit 29.

Moreover, the document-reading unit 22, when reading a document that is fed from the document-feeding unit 23, moves the scanner to a position that faces the document-reading slit. Then, the document-reading unit 22, via the document-reading slit, acquires image data by reading a document in synchronization with the document conveying operation by the document-feeding unit 23. The document-reading unit 22 stores the acquired image data in the storage unit 29.

The document-feeding unit 23 conveys a document that is read by the document-reading unit 22. The document-feeding unit 23 is arranged on the upper portion of the document-reading unit 22.

The document-feeding unit 23 includes a document-placement unit and a document-conveying mechanism. The document-feeding unit 23 feed a document to the document-reading unit 22 by sequentially feeding a document that is placed on the document-placement unit one sheet at a time by the document-conveying mechanism.

The paper-supply unit 24 is a paper-supply unit that feeds printing paper to the image-forming unit 27 one sheet at a time. The paper-supply unit 24 is provided in the main body.

The network-transmission/reception unit 25 is a network-connecting unit that includes a LAN board, wireless transceiver, and the like for connecting to the network 5.

The network-transmission/reception unit 25 transmits and receives data by a data-communication line, and transmits and receives voice signals by a voice telephone line.

The operation-panel unit 26 includes an input unit 46 such as buttons, a touch panel and the like, and a display unit 47 such as a LCD (Liquid Crystal Display), organic EL display, and the like. Moreover, the operation-panel unit 26 is arranged on the front side of the image forming apparatus 2.

The buttons of the input unit 46 are a numeric keypad, a start button, a cancel button, an operation mode switch, buttons for performing instructions related to executing jobs, and the like. The operation modes include various modes such as copying, FAX transmission, scanner, network scanner and the like. In addition, the input unit 46 acquires instructions by a user for output settings of various jobs of the image forming apparatus 2.

Moreover, instructions by the input unit 46 related to executing jobs also include a pull output instruction. When giving an instruction for pull output, the input unit 46 can select document data 40 (refer to FIG. 4) that is stored in the server 1, and perform an output instruction. Furthermore, the input unit 46 is also capable of an instruction that indicates the output method for how to perform this output. This output method is not only printing, but it is also possible to instruct output corresponding to various functions of the image forming apparatus 2 such as facsimile transmission, e-mail transmission, FTP transmission, PDF conversion, and the like.

In addition, it is also possible to input or change the information of each user by a user instruction that is acquired from the input unit 46.

The image-forming unit 27 is a forming unit that, according to an output instruction of a user, forms an image on printing paper from document data 400 (refer to FIG. 4) that is stored in the storage unit 29, read by the document-reading unit 22 or acquired from the terminal 3.

The image-forming unit 27 includes a photosensitive drum, an exposing unit, a developing unit, a transferring unit, a fixing unit, and the like. The image-forming unit 27 prints a toner image on printing paper by executing an image-forming process that includes charging, exposing, developing, transferring and fixing.

The FAX-transmission/reception unit 28 is a transmission/reception unit that performs facsimile transmission and reception. The FAX-transmission/reception unit 28 can receive a facsimile from another FAX apparatus via a voice line, store the facsimile in the storage unit 29, and cause the image-forming unit 27 to form an image of the facsimile. Moreover, the FAX-transmission/reception unit 28 can convert data of a document that is read by the document-reading unit 22 or convert data of a network FAX that is transmitted from the terminal 3 to image data, and transmit a facsimile to another FAX apparatus via a voice line.

The storage unit 29 is a storage unit that uses a semiconductor recording medium such as ROM, RAM and the like, or is a non-transitory recording medium such as a HDD.

A control program for performing operation control of the image forming apparatus 2 is stored in ROM or HDD of the storage unit 29. In addition, the storage unit 29 stores account settings of users. Moreover, the storage unit 29 may also include an area for document boxes for each user.

Incidentally, in the image forming apparatus 2, the control unit 20 and the image-processing unit 21 may be integrally formed such as in a CPU or the like with a built-in GPU or as in the case of a chip-on-module package.

Furthermore, the control unit 20 and the image-processing unit 21 may also incorporate a RAM, ROM, flash memory and the like.

Functional Configuration of Image Forming System X

Here, in reference to FIG. 4, the functional configuration of image forming system X of an embodiment according to the present disclosure will be explained.

The control unit 10 of the server 1 includes a document-data-receiving unit 100, a data-type-determining unit 110, a document-data-retransmitting unit 120, a model-information-acquiring unit 130, a preview-creating unit 140 and a preview-transmitting unit 150.

The storage unit 19 of the server 1 stores document data 400, direct/pull-instruction information data 401, output setting information 402, model information 410, and preview data 420.

The control unit 20 of the image forming apparatus 2 includes a preview-data-acquiring unit 200, a document-data-acquiring unit 210 and a rasterizing unit 220.

The storage unit 29 of the image forming apparatus 2 stores document data 400, model information 410, preview data 420, and output data 430.

The control unit 30 of the terminal 3 includes a document-data-creating unit 300, and document-data-transmitting unit 310.

The storage unit 39 of the terminal 3 stores document data 400, direct/pull-instruction information 401, and output-setting information 402.

The document-data-receiving unit 100 receives document data 400 from the document-data-transmitting unit 310 of the terminal 3, and stores the document data 400 in the storage unit 19. Moreover, the document-data-receiving unit 100 may spool document data 400 as a queue Q.

The data-type-determining unit 110 determines whether the document data 400 that is received by the document-data-receiving unit 100 is direct output data that is directly outputted by the image forming apparatus 2, or is pull-output data that is outputted according to an instruction of the image forming apparatus 2 after being stored in the server 1. The data-type-determining unit 110 may determine whether output is direct output or pull output according to direct/pull-instruction information 401 that is included in a queue Q.

When the data-type-determining unit 110 determines that the document data 400 is direct-output data, the document-data-retransmitting unit 120 transmits the document data 400 as is to the image forming apparatus 2. Moreover, the document-data-retransmitting unit 120 does not need to store this document data 400 in a document box of the storage unit 19.

When the data-type-determining unit 110 determines that the document data 400 is pull-output data, the model-information-acquiring unit 130 acquires model information 410 from the image forming apparatus 2, and stores the model information 410 in the storage unit 19.

The preview-creating unit 140 creates preview data by performing rasterization of the document data 400 according to the model information 410 that is acquired by the model-information-acquiring unit 130.

Moreover, the preview-creating unit 140, via an emulator E that is prepared in accordance to the model information 410 of the image forming apparatus 2, may perform rasterization by the same process as the rasterizing unit 220 that is executed by that image forming apparatus 2. This emulator E, for example, via a virtual machine or the like, is able to execute RIP (Raster Image Processor, Rasterize will simply be referred to as "rasterization" hereafter) processing in the server similar to that of the rasterizing unit 220 in the same environment as the control unit 20 of the image forming apparatus 2. In other words, the preview data 420 of the document data 400 that is created by the preview-creating unit 140 is the same as the output data 430 that is created by the rasterizing unit 220 of the image forming apparatus 2.

Incidentally, the emulator E is able to simultaneously execute emulators in a plurality of environments that correspond to each item of information of the model information 410 described later, and furthermore, is also able to start or stop emulation by changing the environment.

The preview-transmitting unit 150 transmits preview data 420 that is created by the preview-creating unit 140 to the image forming apparatus 2.

In this embodiment, in response to executing by the preview-data-acquiring unit 200, the input unit 46 acquires instructions for selecting and outputting document data 400 that is pull-output data stored in the server 1.

In this embodiment, the display unit 47 displays preview data 420 that is acquired by the preview-data-acquiring unit 200.

The preview-data-acquiring unit 200 receives preview data 420 of the document data 400 that is selected by the input unit 46 from the server 1. When doing this, the preview-data-acquiring unit 200 may execute GUI processing at the time of pull output, transmit the model information 410 to the server 1, and give an instruction to create preview data 420.

The document-acquiring unit 210 acquires document data 400 from the server 1. This document data 400 may be direct output data, or may be pull-output data for which there is an output instruction.

Incidentally, the document-data-acquiring unit 210 is also able to directly acquire document data 400 from the terminal 3.

The rasterizing unit 220 performs rasterization of document data 400 that is acquired by the document-data-acquiring unit 210, and creates output data 430. When doing this, for example, the rasterizing unit 220 is able to interpret the document data 400, and convert the document data 400 to bitmap image data or the like for output that corresponds to the output method. Moreover, the rasterizing unit 220 is able to collect this image data in an electronic document file in a format such as PDF (Portable Document Format) and the like.

The document-data-creating unit 300 is called from an application or the like and generates document data 400 by executing a device driver or the like of the image forming apparatus 2 for a spooled document. When doing this, the document-data-creating unit 300 can set according to the settings and the like of the device driver whether the document data 400 is direct-output data or pull-output data, and perform an instruction for the output method.

The document-data-transmitting unit 310 transmits the document data 400 that is created by the document-data-creating unit 300 to the server 1 as direct-output data or pull-output data. When doing this, the document-data-transmitting unit 310 can give an instruction so that the direct/pull-instruction information 401 and the output-setting information 402 that are set by the document-data-creating unit 300 are set in a queue Q.

The document data 400 is outputted by the device driver and is data of a document to be outputted by the image forming apparatus 2. The document data 400, is, for example, a file such as a PDL (Page Description Language) file, PS (Post Script (registered trademark)) file and the like, a structured document file such as an XML (Extensible Markup Language) file, or HTML (Hyper Text Markup Language) file, a file of various applications for the terminal 3 or image forming apparatus 2 such a word processor, spreadsheet software, presentation software and the like, image data, compressed image data, plain text file, and the like.

Moreover, when the document data 400 is spooled in the storage unit 19 of the server 1 as a queue Q, direct/pull-instruction information 401, output-setting information 402 may be added in document data 400 units.

The direct/pull-instruction information 401 is data indicating an output instruction that indicates either direct output or pull output. In direct output, the document data 400 is directly transmitted to the image forming apparatus 2 without being stored in the server 1. In other words, in direct output, the document data 400 is directly outputted to the image forming apparatus 2 as in so-called "direct printing" or the like. Moreover, pull output is output in which document data 400 that is temporarily stored in the storage unit 19 of the server 1 is outputted according to an instruction from the image forming apparatus 2. In other words, in pull output, actual output is executed according to a user instruction such as in so-called "pull-printing", or the like.

The output-setting information 402 is information that indicates the output method. Output-setting information 402 may be set based on an instruction by the document-data-creating unit 300 of the terminal 3, or based on an instruction from the operation-panel unit 26 of the image forming apparatus 2. Moreover, the output-setting information 402 may set various output methods that correspond to the model information 410.

Incidentally, configuration is also possible in which output-setting information 402 is not included in a queue Q, and can be set only in the image forming apparatus 2.

The model information 410 is identification information that indicates the model of the image forming apparatus 2, the version of firmware including the version of the rasterizing unit 220, mounted amount of memory or HDD, and other information indicating the environment related to rasterization by the image forming apparatus 2.

The preview data 420 is created by the preview-creating unit 140 of the server 1, and is data for previewing the document data 400 during pull output. The preview data 420 may be mostly the same as the output data 430 when the document data 400 is rasterized by the rasterizing unit 220 of the image forming apparatus 2 as will be explained below.

The output data 430 is created by the rasterizing unit 220 of the image forming apparatus 2, and is rasterized data of the document data 400. The output data 430, for example, may be image data such as bitmap data or the like for printing by the image-forming unit 27, or for transmitting by the FAX-transmission/reception unit 28. In addition, the output data 430 may be electronic document data such as PDF or the like for transmission in e-mail, FTP or the like.

Moreover, the output data 430 may be data that, due to the model of the image forming apparatus 2, the version of the rasterizing unit 220 or the like, may have a different appearance or contents at the time of printing.

Here, the control unit 10 of the server 1, by executing the control program that is stored in the storage unit 19, is made to function as the document-data-receiving unit 100, the data-type-determining unit 110, the document-data-retransmitting unit 120, the model-information-acquiring unit 130, the preview-creating unit 140, and the preview-transmitting unit 150.

Furthermore, the control unit 20 of the image forming apparatus 2, by executing the control program that is stored in the storage unit 29, is made to function as the preview-data-acquiring unit 200, the document-data-acquiring unit 210 and the rasterizing unit 220.

In addition, the control unit 30 of the terminal 3, by executing the control program that is stored in the storage unit 39, is made to function as the document-data-creating unit 300 and the document-data-transmitting unit 310.

Moreover, each of the units of the server 1, the image forming apparatus 2 and the terminal 3 described above are hardware resources that execute the image forming method according to the present disclosure.

Incidentally, part or an arbitrary combination of the functional configuration described above may be configured by hardware such as an IC, programmable logic, or the like.

Document Storage and Transmission Process by the Server 1

Figure 5:
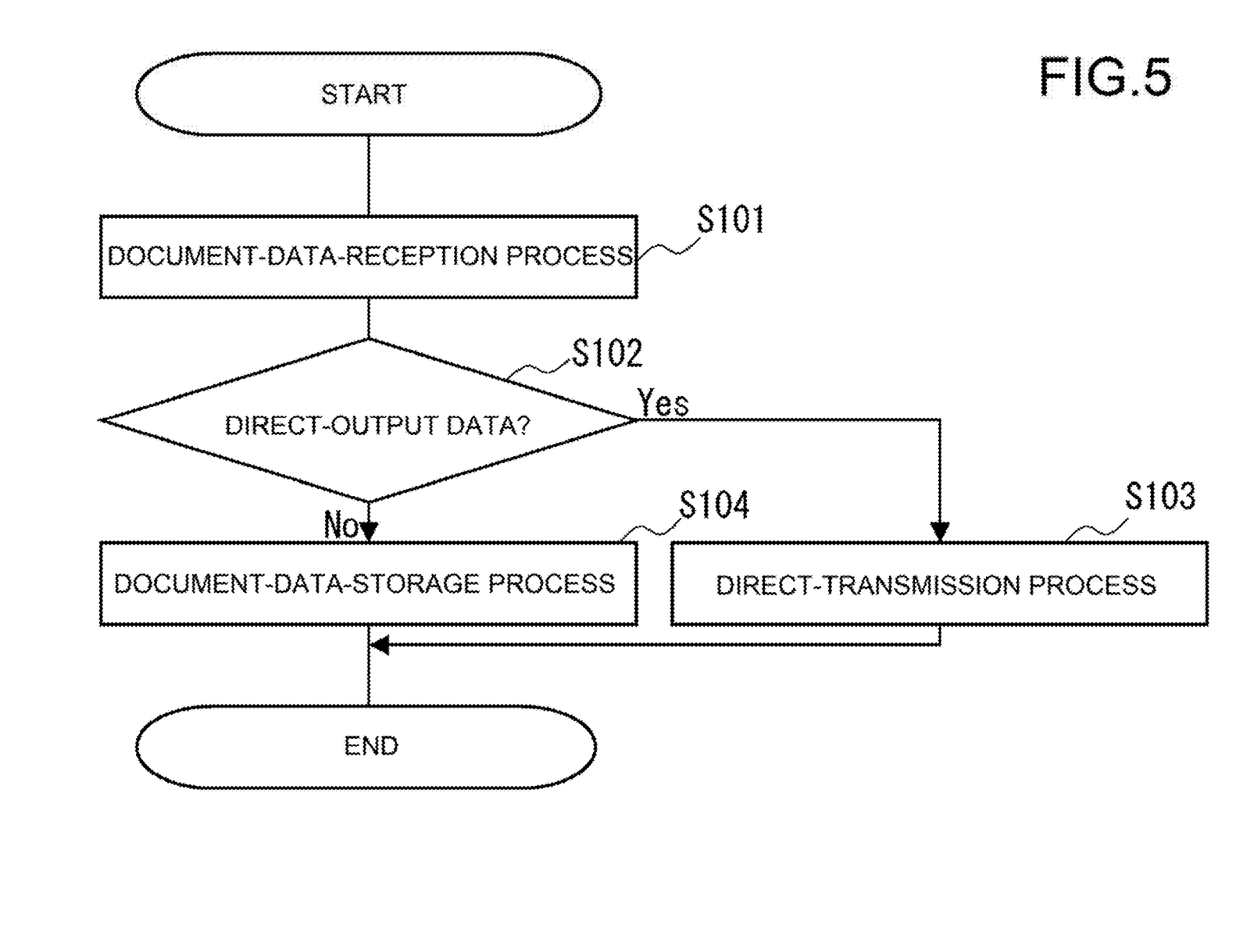
FIG. 5 is a flowchart of a document storage and transmission process of an embodiment according to the present disclosure.

Next, the document storage and transmission process by the sever 1 of the image forming system X of an embodiment according to the present disclosure will be explained with reference to FIG. 5.

In the document storage and transmission process of this embodiment, document data 400 is received from the terminal 3. Then, whether the received document data 400 is direct-output data or pull-output data is determined. Moreover, when it is determined that the document data 400 is direct-output data, the document data 400 is transmitted as is to the image forming apparatus 2. Furthermore, when the document data 400 is determined to be pull-output data, the document data 400 is stored as a queue Q.

In the document storage and transmission process of this embodiment, mainly the control unit 10 executes a program that is stored in the storage unit 19 using the hardware resources in cooperation of each of the units.

In the following, each step of the document storage and transmission process of this embodiment will be explained in detail with reference to the flowchart in FIG. 5.

Step S101

First, the document-data-receiving unit 100 performs a document-data-receiving process.

The document-data-receiving unit 100 receives document data 400 from the terminal 3, and stores the document data 400 in the storage unit 19. Moreover, during transmission by the document-data-transmitting unit 310 of the terminal 3, direct/pull-instruction information 401 and output-setting information 402 may be added to the document data 400.

Step S102

Next, the data-type-determining unit 110 determines whether or not the document data 400 is direct-output data. The data-type-determining unit 110 determines whether the document data 400 that is received by the document-data-receiving unit 100 is direct-output data, or is pull-output data. The data-type-determining unit 110, for example, may determine from the direct/pull-instruction information 401 that is added to the document data 400 whether the document data 400 is direct-output data or pull-output data. When the document data 400 is direct-output data, the data-type-determining unit 110 determines YES. Moreover, when the document data 400 is pull-output data, the data-type-determining unit 110 determines NO.

In the case of YES, the data-type-determining unit 110 advances the process to step S103.

In the case of NO, the data-type-determining unit 110 advances the process to step S104.

Step S103

When the document data 400 is direct-output data, the document-data-retransmitting unit 120 performs a direct-transmission process.

The document-data-retransmitting unit 120 transmits (transfers) the document data 400 to the image forming apparatus 2 again, and causes the document data 400 to be outputted. This output may be output that is the same as the output that is directly outputted to the image forming apparatus 2 from the terminal 3. Moreover, the document-data-retransmitting unit 120 may select a suitable image forming apparatus 2 according to user information, billing information or the like of the user that created the document data 400, and transmit the document data 400.

As a result, the directly-transmitted document data 400 is outputted by the image forming apparatus 2 according to the output-setting information 402 that is set in the queue.

After that, the document-data-retransmitting unit 120 ends the document storage and transmission process.

Step S104

When the document data 400 is pull-output data, the document-data-receiving unit 100 performs a document-data-storage process.

The document-data-receiving unit 100 spools and stores the document data 400 in the storage unit 19 as a queue Q. When doing this, the document-data-receiving unit 100 may store document data 400 in document boxes for each user, or according to an instruction from the terminal 3.

With the above, the document storage and transmission process of this embodiment according to the present disclosure ends.

Pull-output Process by the Server 1 and Image Forming Apparatus 2

Figure 6:
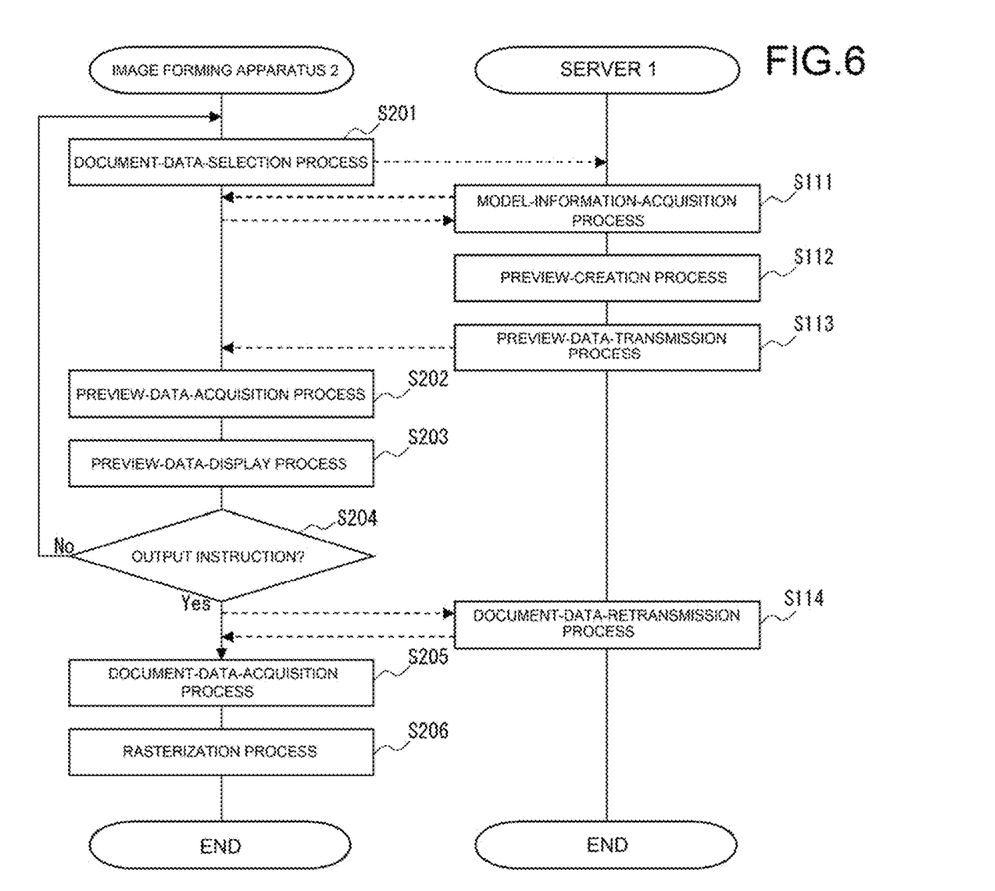
FIG. 6 is a flowchart of a pull output process of an embodiment according to the present disclosure.

Next, the pull-output process by the server 1 and image forming apparatus 2 of the image forming system X of an embodiment according to the present disclosure will be explained with reference to FIG. 6 and FIG. 7.

In the pull-output process of this embodiment, the image forming apparatus 2 selects document data 400 that is the pull-output data stored in the server 1. Then, the server 1 acquires model information 410 from the image forming apparatus 2. Next, preview data 420 is created for the document data 400 by performing rasterization according to the acquired model information 410. The image forming apparatus 2 acquires preview data 420 of the selected document data 400 from the server 1, and displays the acquired preview data 420. Then, when there is an output instruction, this document data 400 is acquired from the server 1 and outputted according to the output method.

In the pull-output process of this embodiment, mainly the control unit 10 executes a program that is stored in the storage unit 19, and the control unit 20 executes a program that is stored in the storage unit 29 using the hardware resources with cooperation of each of the units of the respective apparatuses.

In the following, each step of the pull-output process of this embodiment will be explained in detail with reference to the flowchart in FIG. 6.

Step S201

First, the preview-data-acquiring unit 200 of the image forming apparatus 2 performs a document-data-selection process using the input unit and display unit.

Figure 7:
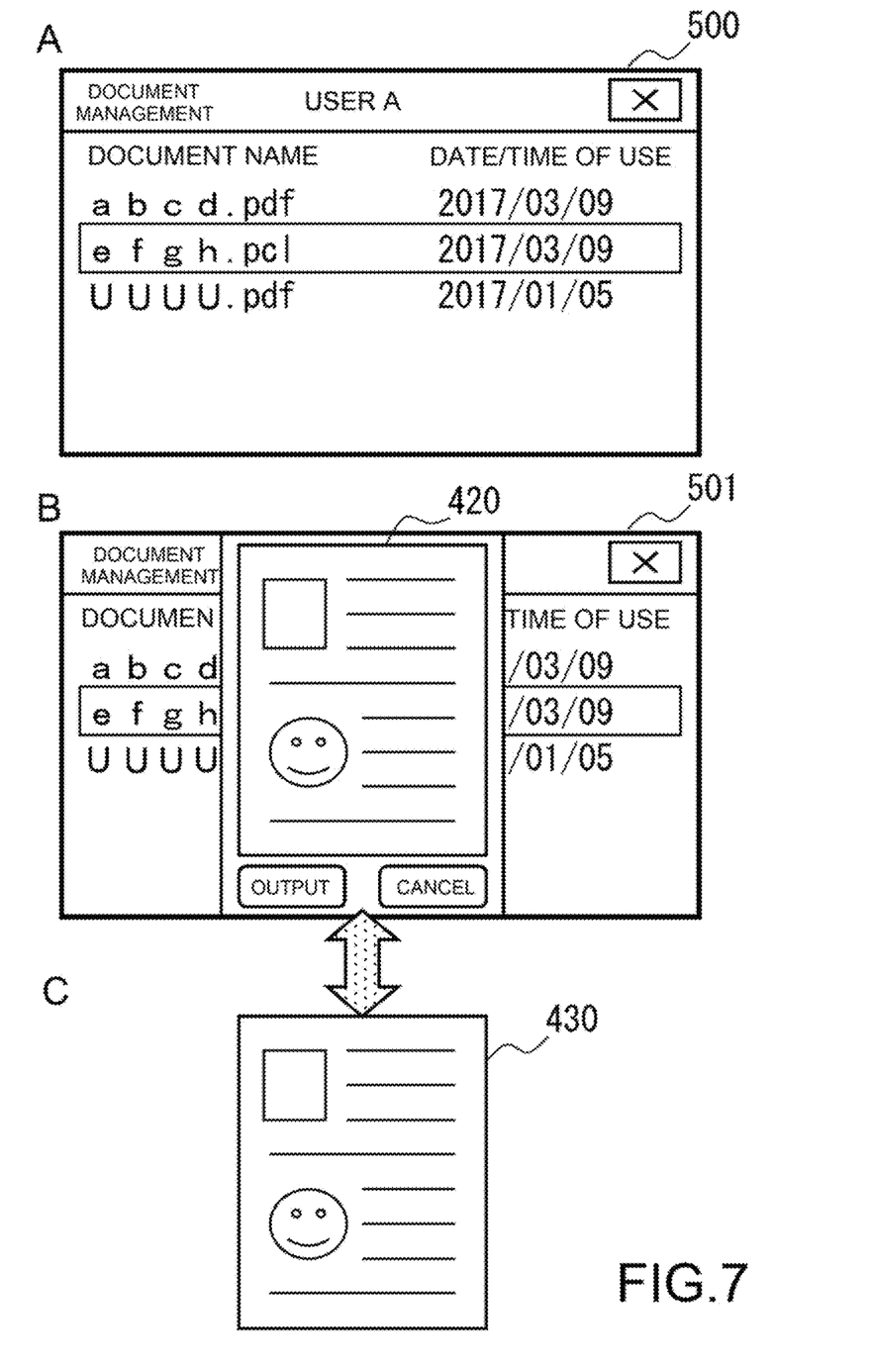
FIG. 7 is a concept diagram of the pull output process illustrated in FIG. 6.

According to the screen example 500 of element A in FIG. 7, the preview-data-acquiring unit 200 acquires a list of document data 400 for pull output that is spooled in the server 1 from the server 1, displays the list on the display unit 47 and allows selection by the GUI. In this example, "efgh.pcl" inside the frame is selected.

When document data 400 is selected by the input unit 46, the preview-data-acquiring 200 transmits the selection information and model information 410 to the server 1, and instructs creation of preview data 420.

Incidentally, the preview-data-acquiring unit 200 may also perform user authentication using account settings at the time of this pull-output process.

Step S111

Here, the model-information-acquiring unit 130 of the server 1 performs a model-information-acquisition process.

When an instruction to create preview data 420 is acquired, the model-information-acquiring unit 130 acquires model information 410 from the image forming apparatus 2, and stores that model information 410 in the storage unit 19.

Step S112

Next, the preview-creating unit 140 performs a preview-creation process.

The preview-creating unit 140 creates preview data 420 by performing rasterization of document data 400 that is spooled in the storage unit 19 as pull-output data for which there is an instruction to create preview data 420. When doing this, the preview-creating unit 140, for example, transmits document data 400 to a virtual machine or the like in the execution environment of an emulator E that corresponds to model information 410, acquires created preview data 420, and the like, and temporarily stores the preview data 420 in the storage unit 19. When doing this, the document data 400 and the preview data 420 may be transmitted to or received from the virtual machine using packet communication, interprocess communication, a storage file conversion function, or the like.

Step S113

Next, the preview-transmitting unit 150 performs a preview-data-transmission process. The preview-transmitting unit 150 transmits preview data 420 that is created by the preview-creating unit 140 to the image forming apparatus 2.

Step S202

Here, the preview-data-acquiring unit 200 of the image forming apparatus 2 performs a preview-data-acquisition process.

The preview-data-acquiring unit 200 acquires preview data 420 of the document data 400 for which creation of preview data 420 has been instructed from the server 1, and stores the preview data 420 in the storage unit 19.

Step S203

Next, the preview-data-acquiring unit 200 uses the display unit 47 to perform a preview-data-display process.

According to the screen example 501 of element B in FIG. 7, the preview-data-acquiring unit 200 displays the acquired preview data 420. When doing this, the preview-data-acquiring unit 200 may display an output button for instructing the output of preview data 420, and may display a cancel button to not output the preview data 420.

Moreover, the preview-data-acquiring unit 200 may display a plurality of pages of preview data 420, may enlarge or reduce part of the preview data 420, or may scroll the preview data 420.

Step S204

Next, the preview-data-acquiring unit 200 determines whether or not there is an output instruction via the input unit 46. In the screen example 501 in element B of FIG. 7, when the "Output" button is pressed, the preview-data-acquiring unit 200 determines YES. When the "Cancel" button is pressed or the like, the preview-data-acquiring unit 200 determines NO.

In the case of YES, the preview-data-acquiring unit 200 advances the process to step S114. When doing this, the document-data-acquiring unit 210 gives an instruction to transmit the selected document data 400 to the server 1.

In the case of NO, the preview-data-acquiring unit 200 returns the process to step S201, and continues the selection of document data 400.

Step S114

Here, when there is an output instruction, the document-data-retransmitting unit 120 of the server 1 performs a document-data-retransmission process.

The document-data-retransmitting unit 120 transmits the document data 400 for which there is an output instruction to the image forming apparatus 2.

Step S205

Here, the document-data-acquiring unit 210 of the image forming apparatus 2 performs a document-data-acquisition process.

The document-data-acquiring unit 210 acquires document data 400 for which there is an output instruction from the server 1, and temporarily stores the document data 400 in the storage unit 29.

Step S206

Next, the rasterizing unit 220 performs a rasterization process.

The rasterizing unit 220 rasterizes the document data 400 that is acquired by the document-data-acquiring unit 210, and creates output data 430.

According to Element C in FIG. 7, this rasterized output data 430 is mostly the same as the preview image data.

After that, the rasterizing unit 220 causes the output data 430 to be outputted according to output setting information 402 of the queue Q, or according to an output instruction by the operation-panel unit 26.

From the above, the pull-output process of an embodiment according to the present disclosure ends.

With the configuration described above, the following effects can be obtained.

Conventionally, even when rasterization is performed using the same document data, it is not always possible to output the same output data due to differences in the model of image forming apparatus, version of the rasterizing unit, the OS and the environment. Therefore, as in the case of a typical system described above, image data that is generated when rasterization is performed by the server may differ from image data that is generated when rasterization is performed by the image forming apparatus. As a result, when generating preview data of the document data in the server at the time of pull output, a true preview cannot be generated, which is an inconvenience for the user.

However, the image forming system X of an embodiment according to the present disclosure is an image forming system that includes a terminal 3, a server 1 and an image forming apparatus 2. The terminal 3 includes a document-data-transmitting unit 310 that transmits document data 400 to the server 1 as direct-output data that is directly outputted by the image forming apparatus 2, or as pull-output data that is stored in and server 1 and outputted according to an instruction of the image forming apparatus 2. The server 1 includes: a document-data-receiving unit 100 that receives document data 400 from the terminal 3; a data-type-determining unit 110 that determines whether the document data 400 that is received by the document-data-receiving unit 100 is direct-output data or pull-output data; a document-data-retransmitting unit 120 the transmits document data 400 as is to the image forming apparatus 2 when the document data 400 is determined to be direct-output data by the data-type-determining unit 110; a model-information-acquiring unit 130 that acquires model information 410 from the image forming apparatus 2 when the document data 400 is determined to be pull-output data by the data-type-determining unit 110; a preview-creating unit 140 that performs rasterization of the document data 400 according to the model information 410 acquired by the model-information-acquiring unit 130 and creates preview data 420; and a preview-transmitting unit 150 that transmits the preview data 420 that is created by the preview-creating unit 140 to the image forming apparatus 2. The image forming apparatus 2 includes: an input unit that acquires an instruction to select and output document data 400 that is pull-output data that is stored in the server 1; a preview-data-acquiring unit 200 that receives preview data 420 of the document data 400 selected by the input unit from the server 1; a display unit that displays the preview data 420 that is acquired by the preview-data-acquiring unit 200; a document-data-acquiring unit 210 that acquires document data 400 for which there is an output instruction by the input unit from the server 1, and also acquires document data 400 that is direct-output data from the server 1; and a rasterizing unit 220 that performs rasterization of the document data 400 that is acquired by the document-data-acquiring unit 210, and creates output data 430.

With this kind of configuration, the server 1 performs rasterization according to model information 410, and creates true preview data 420 that is mostly the same as the output data 430 that is outputted by the image forming apparatus 2 that instructs pull printing, so viewing true preview data 420 is possible. As a result, convenience for the user can be improved. Particularly, even in the case of outputting document data 400 that differs slightly in multiple versions after viewing a preview, or in the case when it is desired to output document data 400 after checking the document data 400 before outputting in order to print on special paper, it is possible to view a preview that is the same as the document data 400 that will be actually outputted, so it is possible to reduce the possibility of output loss, and also reduce cost.

Moreover, in typical technology described above, the server creates image data by always performing rasterization of files requiring rasterization. Therefore, the load on the server is large.

However, in the image forming system X of an embodiment according to the present disclosure, the server performs rasterization only when creating preview data 420, and the document data 400 that is transmitted during pull output is unchanged, so the load on the server 1 can be reduced and the output performance can be improved.

Moreover, in the server 1 of an embodiment according to the present disclosure, the preview-creating unit 140 performs rasterization by an emulator that is prepared according to model information 410 of the image forming apparatus 2 using a process that is the same as that of the rasterizing unit 220 that is executed by the image forming apparatus 2.

With this kind of configuration, the server 1 is definitely able to create preview data 420 that is the same as that by the image forming apparatus 2. By the emulator executing rasterization, it is possible to reduce the security risk such as the server 1 being hacked by unauthorized data or the like.

Other Embodiments

In addition, in the embodiment described above, it is described that the preview data 420 is created for the entire document data 400 for pull output.

However, preview data may also be created for same page(s) such as the first page or the like, or for one page at a time of pages specified by the user when viewing the preview data. Moreover, the created preview data does not absolutely need to completely match the output data 430, and the preview data may be created with lower resolution or the like, or the images and the like of the created preview data may be compressed.

Furthermore, in the embodiment described above, even though it is described that preview data is created after waiting for an instruction from the image forming apparatus 2 at the time of pull output, preview data for a plurality of models may be created at the time when the server 1 stores the document data 400 from the terminal 3, or during free time of the server 1.

As a result, it becomes possible to reduce the load on the server 1 and image forming apparatus 2, and to reduce the communication load when transmitting preview data.

Moreover, in the server 1, emulators corresponding to a plurality of models may always be activated.

As a result, it is possible to reduce the load for activating an emulator when creating preview data 420.

Furthermore, in the embodiment described above it is described that the output data 430 is created by rasterization in the image forming apparatus 2.

However, the server 1 may perform the same rasterization as the image forming apparatus 2, and transmit and output the created output data 430 as is to the image forming apparatus 2. When doing this, the user is able to specify the model, the version of the rasterizing unit 220 and the like of the image forming apparatus desired for output, and obtain output data 430 by the server performing rasterization in accordance to this.

As a result, in the case in which the image forming apparatus 2 that is originally desired for output fails and output is performed by a substitute apparatus, or in the case in which it is desired to obtain an output result that is the same as that of a specified model or version of rasterizing unit 220, it is possible to flexibly receive the same output result.

Moreover, configuration is also possible in which when executing an emulator described above by the preview-creating unit 140 of the server 1 and unauthorized document data 400 is detected such as when the data is infected with a virus or the like, or when there is trouble such as a buffer overrun or the like in the rasterization process, a security warning occurs and output by the image forming apparatus 2 is not allowed.

With this kind of configuration, the security risk of the image forming apparatus 2 can be reduced.

In addition, the technology according to the present disclosure can also be applied to information processing apparatuses other than an image forming apparatus. In other words, configuration is also possible in which a network scanner, a server or the like to which scanner are separately connected by a USB or the like is used.

In the typical image forming system described above, even when data files are of the same document data or the like, when the data file is rasterized by the server and when the data file is rasterized by the image forming apparatus, the generated image data is sometimes different.

Therefore, when document data is temporarily spooled on the server and pull output is performed for rasterizing and outputting this document data according to an instruction from the image forming apparatus, true preview data cannot be created by the server.

However, with the technology according to the present disclosure, it is possible to provide an image forming apparatus that is capable of acquiring model information of the image forming apparatus and creating true preview data by the server by performing rasterization according to the model information by the server during pull output.

Moreover, the configuration and operation of the embodiments above are only examples, and needless to say may be appropriately modified and executed within a range that does not depart from the gist of the present disclosure.

What is claimed is:

1. An image forming system comprising a terminal, a server, and an image forming apparatus; wherein
the terminal comprises
a document-data-transmitting unit that transmits document data to the server as direct-output data that is directly outputted by the image forming apparatus, or as pull-output data that is stored in the server and outputted according to an instruction from the image forming apparatus;

the server comprises:

a document-data-receiving unit that receives the document data from the terminal;

a data-type-determining unit that determines whether document data that is received by the document-data-receiving unit is direct-output data or pull-output data;

a document-data-retransmitting unit that, when the document data is determined to be direct-output data by the data-type-determining unit, transmits the document data as is to the image forming apparatus;

a model-information-acquiring unit that, when an instruction for preview data is received from the image forming apparatus, acquires model information from the image forming apparatus;

a preview-creating unit that performs a plurality of rasterizations of the document data to create a plurality of respective preview data, wherein each of the plurality of rasterizations is performed according to different model information, and wherein the plurality of rasterizations are performed prior to receiving the instruction for preview data from the image forming apparatus; and a preview-transmitting unit that transmits, according to model information of the image forming apparatus, a preview data of the plurality of respective preview data created by the preview-data-creating unit to the image forming apparatus in response to the instruction for preview data being received from the image forming apparatus; and the image forming apparatus comprises:

an input unit that acquires an instruction for selecting and outputting the document data that is pull-output data stored in the server;

a preview-data-acquiring unit that sends the instruction for preview data to the image forming apparatus and acquires the preview data of the document data that is selected by the input unit from the server;

a display unit that displays the preview data that is acquired by the preview-data-acquiring unit;

a document-data-acquiring unit that acquires the document data for which there is an output instruction by the input unit from the server, and also acquires the document data that is direct-output data from the server; and a rasterizing unit that performs rasterization of the document data that is acquired by the document-data-acquiring unit, and creates output data.

2. The image forming system according to claim 1, wherein the preview-creating unit performs rasterization by an emulator that is prepared according to the model information of the image forming apparatus using the same processing as the rasterizing unit that is executed by the image forming apparatus.

3. A server comprising:

a document-data-receiving unit that receives document data from a terminal;

a data-type-determining unit that determines whether the document data that is received by the document-data-receiving unit is direct-output data from the terminal that is directly outputted by an image forming apparatus, or pull-output data that is stored in the server and then outputted according to an instruction from the image forming apparatus;

a document-data-retransmitting unit that, when the document data is determined to be direct-output data by the data-type-determining unit, transmits the document data as is to the image forming apparatus;

a model-information-acquiring unit that, when an instruction for preview data is received from the image forming apparatus, acquires model information from the image forming apparatus;

a preview-creating unit that performs a plurality of rasterizations to create a plurality of respective preview data, wherein each of the plurality of rasterizations is performed according different model information and wherein the plurality of rasterizations are performed prior to receiving the instruction for preview data from the image forming apparatus; and a preview-transmitting unit that transmits, according to model information of the image forming apparatus, a preview data of the plurality of respective preview data that is created by the preview-creating unit to the image forming apparatus in response to the instruction for preview data being received from the image forming apparatus.

4. An image forming method that is executed by an image forming system that includes a terminal, a server and an image forming apparatus comprising the steps of:

in the terminal, transmitting document data to the server as direct-output data that is directly outputted by the image forming apparatus, or as pull-output data that is stored in the server and then outputted according to an instruction from the image forming apparatus;

in the server, receiving the document data from the terminal;

determining whether the received document data is direct-output data or pull-output data;

transmitting, when the document data is determined to be direct-output data, the document data as is to the image forming apparatus;

acquiring, when an instruction for preview data is received from the image forming apparatus, model information from the image forming apparatus;

performing a plurality of rasterizations of the document data to create a plurality of respective preview data, wherein each of the plurality of rasterizations is performed according to different model information, wherein the plurality of rasterizations are performed prior to the step of receiving the instruction for preview data from the image forming apparatus; and transmitting, according to model information of the image forming apparatus, a created preview data of the plurality of respective preview data to the image forming apparatus in response to the instruction for preview data being received from the image forming apparatus; and in the image forming apparatus, acquiring an instruction for selecting and outputting the document data that is pull-output data stored in the server;

sending the instruction for preview data to the image forming apparatus;

acquiring the preview data of the selected document data from the server;

displaying the acquired preview data;

acquiring the document data for which there is an output instruction from the server, and also acquiring the document data that is direct-output data from the server; and performing rasterization of the acquired document data, and creating output data.

\* \* \* \* \*